United States Patent
Chang et al.

(10) Patent No.: US 10,674,125 B2
(45) Date of Patent: Jun. 2, 2020

(54) PROJECTOR AND WAVELENGTH CONVERSION DEVICE

(71) Applicant: Coretronic Corporation, Hsin-Chu (TW)

(72) Inventors: Jui Chang, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/286,462

(22) Filed: Oct. 5, 2016

(65) Prior Publication Data

US 2017/0163947 A1 Jun. 8, 2017

(30) Foreign Application Priority Data

Dec. 2, 2015 (TW) .............................. 104140378 A

(51) Int. Cl.
| | |
|---|---|
| *H04N 9/31* | (2006.01) |
| *G02B 5/02* | (2006.01) |
| *G03B 21/20* | (2006.01) |
| *G02B 26/00* | (2006.01) |

(52) U.S. Cl.
CPC ......... *H04N 9/3158* (2013.01); *G02B 5/0278* (2013.01); *G03B 21/204* (2013.01); *H04N 9/3105* (2013.01); *H04N 9/3164* (2013.01); *H04N 9/3197* (2013.01); *G02B 26/008* (2013.01)

(58) Field of Classification Search
CPC .. G02B 26/008; G02B 5/0278; G03B 21/204; H04N 9/31–3197
See application file for complete search history.

(56) References Cited

U.S. PATENT DOCUMENTS

| | | | |
|---|---|---|---|
| 2008/0055558 A1 | 3/2008 | Tang et al. | |
| 2010/0245776 A1* | 9/2010 | Yamamoto | G03B 21/204 353/38 |
| 2010/0245777 A1* | 9/2010 | Ogura | G02B 5/0215 353/38 |
| 2012/0051044 A1* | 3/2012 | Akiyama | G03B 21/2013 362/233 |

(Continued)

FOREIGN PATENT DOCUMENTS

| | | |
|---|---|---|
| CN | 102419507 A | 4/2012 |
| CN | 102645826 A | 8/2012 |

(Continued)

*Primary Examiner* — Cara E Rakowski
*Assistant Examiner* — Christopher A Lamb, II

(57) ABSTRACT

A projector and a wavelength conversion device thereof are provided. The wavelength conversion device includes a wavelength conversion element and a diffusion element. The wavelength conversion element includes a first substrate and at least one wavelength conversion layer. The at least one wavelength conversion layer is disposed on the first substrate and surrounding an axle center of the first substrate. The at least one wavelength conversion layer is configured to perform a conversion on a light beam. The diffusion element is connected to the first substrate of the wavelength conversion element and surrounding the axle center of the first substrate. The diffusion element is configured to allow another light beam to pass through.

19 Claims, 11 Drawing Sheets

(56) References Cited

U.S. PATENT DOCUMENTS

| | | | |
|---|---|---|---|
| 2014/0176916 A1* | 6/2014 | Masuda | H04N 9/31 353/38 |
| 2015/0185596 A1* | 7/2015 | Hsieh | G03B 21/204 353/84 |
| 2016/0004147 A1* | 1/2016 | Hu | H04N 9/315 362/84 |
| 2016/0026076 A1* | 1/2016 | Hu | G03B 21/204 353/84 |
| 2016/0241822 A1* | 8/2016 | Takagi | H04N 9/3111 |

FOREIGN PATENT DOCUMENTS

| | | |
|---|---|---|
| CN | 102650814 A | 8/2012 |
| CN | 103888702 A | 6/2014 |
| CN | 103968332 A | 8/2014 |
| CN | 104020633 A | 9/2014 |
| JP | 2005173019 A | 6/2005 |
| JP | 2011128521 A | 6/2011 |
| JP | 2012008177 A | 1/2012 |
| TW | 201348747 A | 12/2013 |

\* cited by examiner

PROJECTOR AND WAVELENGTH CONVERSION DEVICE

CROSS-REFERENCE TO RELATED APPLICATION

THIS APPLICATION CLAIMS THE PRIORITY BENEFIT OF TW104140378 FIELD ON Dec. 2, 2015. THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The present invention relates to a projector, and more particularly to a projector equipped with a wavelength conversion device.

BACKGROUND OF THE INVENTION

The current structure of a projector includes an illumination system, a light valve and a projection lens. Specifically, the illumination system is for providing the illumination light beam; the light valve is for converting the illumination light beam into an image light beam; and the projection lens is for projecting the image light beam onto a screen, thereby forming images on the screen. Based on the types of light valve, projectors can be divided to digital light processing (DLP) projector, liquid crystal digital projector and liquid crystal on silicon (LcoS) projector.

However, the illumination system of the existing lighting system projectors must use a lot of optical components, which may lead to problems such as such as high cost, large component size and loud noise. Thus, it is quite import for the person in the art to solve the aforementioned problems.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the present invention is to provide a projector having advantages such as lower cost and smaller component size.

Another object of the present invention is to provide an illumination system used in a projector and able to reduce the number of optical component in the projector thereby having advantages such as lower cost and smaller component size.

In order to achieve one or a portion of or all of the objects or other objects, the invention provides a projector, which includes an illumination system, at least one light valve and a lens. The illumination system includes a light source device and a wavelength conversion device. The light source device is adapted to provide a first light beam and a second light beam. The wavelength conversion device is disposed on transmission paths of the first light beam and the second light beam. The wavelength conversion device includes a wavelength conversion element and a diffusion element. The wavelength conversion element includes a first substrate and at least one wavelength conversion layer. The at least one wavelength conversion layer is disposed on the first substrate and surrounds an axle center of the first substrate. The at least one wavelength conversion layer is adapted to convert the first light beam into a third light beam. The diffusion element is connected to the first substrate and surrounding the axle center of the first substrate. The diffusion element is adapted to allow the second light beam to pass through. The second light beam and the third light beam constitute an illumination light beam. The at least one light valve is disposed on a transmission path of the illumination light beam, and adapted to convert the illumination light beam into an image light beam. The lens is disposed on a transmission path of the image light beam, and adapted to convert the image light beam into a projection light beam.

In order to achieve one or a portion of or all of the objects or other objects, the invention further provides a wavelength conversion device including a wavelength conversion element and a diffusion element. The wavelength conversion element includes a first substrate and at least one wavelength conversion layer. The at least one wavelength conversion layer is disposed on the first substrate and surrounds an axle center of the first substrate. The at least one wavelength conversion layer is adapted to perform a conversion on a light beam. The diffusion element is connected to the first substrate of the wavelength conversion element and surrounding the axle center of the first substrate. The diffusion element is adapted to allow another light beam to pass through.

In one embodiment, a quantity of the at least one wavelength conversion layer is one. The wavelength conversion layer and the diffusion element are disposed in an annular arrangement along a radial direction from the axle center.

In one embodiment, a quantity of the at least one wavelength conversion layer is plural. The wavelength conversion layers respectively have phosphors capable of exciting out beams with different colors. The wavelength conversion layers and the diffusion element are disposed in an annular arrangement along a radial direction from the axle center.

In one embodiment, the diffusion element is disposed between the axle center and the at least one wavelength conversion layer.

In one embodiment, the at least one wavelength conversion layer is disposed between the axle center and the diffusion element.

In one embodiment, the first substrate includes a first surface, a second surface, and a side surface. The first surface and the second surface are opposite to each other and the side surface is adjacently connected between the first surface and the second surface. The at least one wavelength conversion layer is disposed on the first surface. The first substrate is connected to a joint surface of the diffusion element.

In one embodiment, the joint surface is a first flat surface. The side surface of the first substrate is a second flat surface. The first flat surface is jointed to the second flat surface.

In one embodiment, the joint surface is a first stair surface. The side surface of the first substrate is a second stair surface. The first stair surface and the second stair surface are matched with each other. The first stair surface is jointed to the second stair surface.

In one embodiment, the joint surface includes a first joint surface and a second joint surface. The first joint surface is jointed to the side surface. The second joint surface is jointed to the second surface. The first joint surface and the second joint surface are adjacently connected to each other.

In one embodiment, the second surface is disposed between the first surface and the joint surface. The joint surface is jointed to the second surface of the first substrate. A portion of the joint surface is exposed from the first substrate.

In one embodiment, the wavelength conversion device further includes a second substrate. The diffusion element is disposed between the first substrate and the second substrate. The second substrate includes a third surface and a fourth surface opposite to each other. The joint surface includes a first joint surface and a second joint surface. The first joint surface is jointed to the second surface. The second joint surface is jointed to the third surface. The second surface is disposed between the first surface and the first joint surface. The third surface is disposed between the second joint surface and the fourth surface. A portion of the first joint surface is exposed from the first substrate. A portion of the second joint surface is exposed from the second substrate.

In one embodiment, the wavelength conversion device further includes a first connecting structure and a second connecting structure. The first connecting structure is disposed on the joint surface of the diffusion element. The second connecting structure is disposed on the side surface of the first substrate. The first connecting structure and the second connecting structure have structures are matched with each other. The first connecting structure is connected to the second connecting structure.

In one embodiment, the wavelength conversion device further includes an adhesive colloid disposed between the first substrate and the joint surface.

In one embodiment, the first substrate is bonded to the joint surface of the diffusion element through the adhesive colloid.

In summary, the wavelength conversion device of the projector of the embodiment of the present invention includes the wavelength conversion element and the diffusion element both. The wavelength conversion element of the embodiment of the present invention includes the first substrate and the wavelength conversion layer. The wavelength conversion layer is disposed on the first substrate and surrounding the axle center of the first substrate. The diffusion element is connected to the first substrate and surrounding the axle center of the first substrate. Therefore, by designing the wavelength conversion element and the diffusion element to be integrated into a one-piece structure, the problems such as high cost, large component size and loud noise are solved at the same time.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
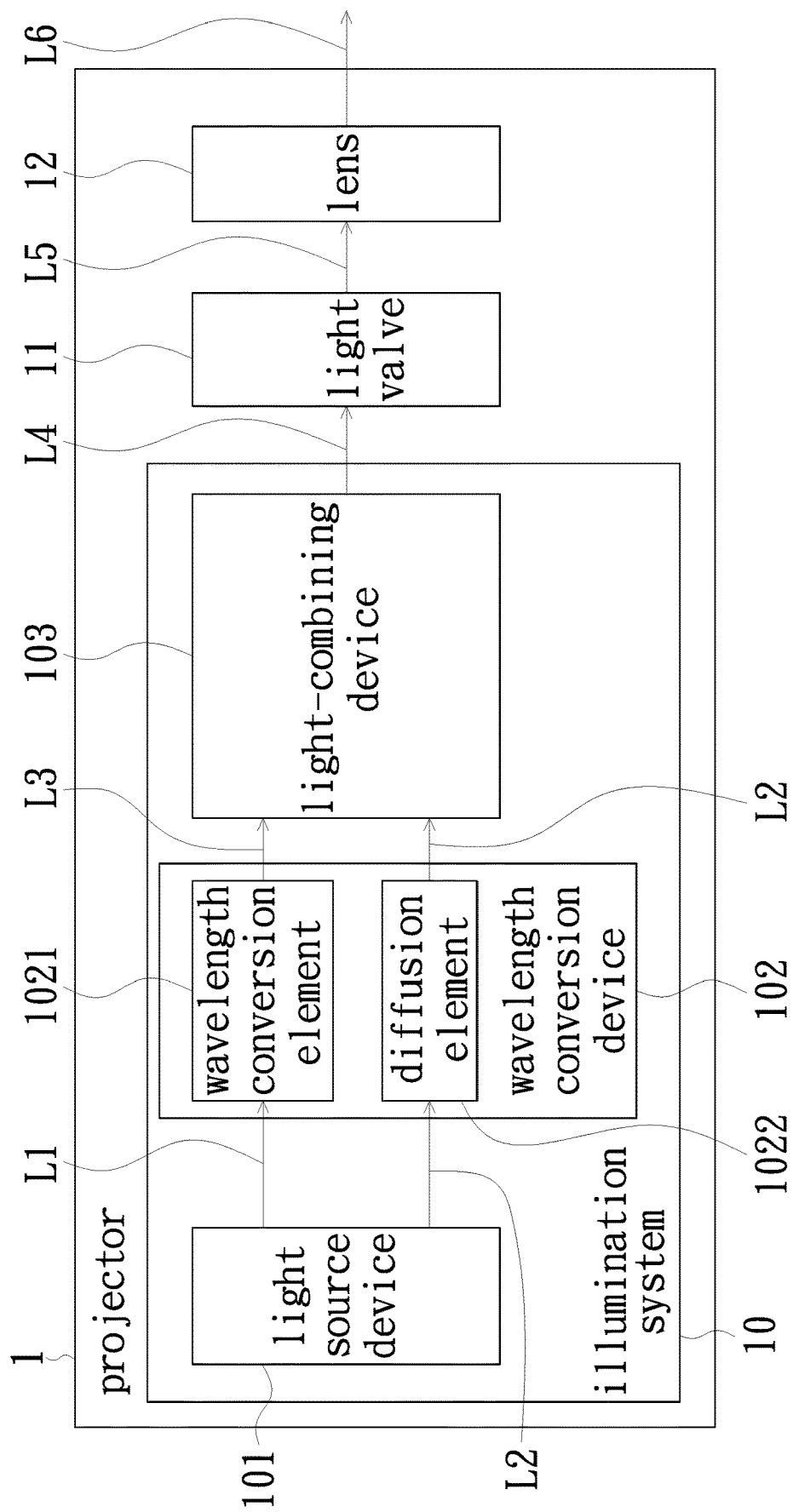
FIG. 1 is a functional block view of a projector in accordance with an embodiment of the invention.

FIG. 1 is a functional block view of a projector in accordance with an embodiment of the invention. As shown in FIG. 1, the projector 1 of the embodiment includes an illumination system 10, at least one light valve 11 and a lens 12. In the embodiment, the illumination system 10 includes a light source device 101, a wavelength conversion device 102 and a light-combining device 103. In the embodiment, the light valve 11 may be a digital micro mirror device (DMD), a liquid crystal on silicon, (LCoS) or a liquid crystal display (LCD), but the invention is not limited thereto.

Please continue to refer to FIG. 1. In the embodiment, the light source device 101 is configured to provide a first light beam L1 and a second light beam L2. The wavelength conversion device 102 is disposed on the transmission paths of the first light beam L1 and the second light beam L2. The wavelength conversion device 102 includes a wavelength conversion element 1021 and a diffusion element 1022. The wavelength conversion element 1021 is configured to convert the first light beam L1 into a third light beam L3. The second light beam L2 can pass through the diffusion element 1022. Specifically, after passing through the diffusion element 1022, the second light beam L2 has scattering or diffusion. In the embodiment, the third light beam L3 converted from the wavelength conversion element 1021 and the second light beam L2 past through the diffusion element 1022 together constitute an illumination light beam L4. Specifically, in the embodiment, the third light beam L3 and the second light beam L2 constitute the illumination light beam L4 through the light-combining device 103. The light valve 11 is disposed on the transmission path of the illumination light beam L4 and configured to convert the illumination light beam L4 into an image beam L5. The lens 12 is disposed on the transmission path of the image beam L5. The lens 12 is configured to convert the image beam L5 into a projection light beam L6 and project the projection light beam L6 out from the projector 1.

The structure of the wavelength conversion device 102 of the embodiment will be described in detail hereunder.

Figure 2:
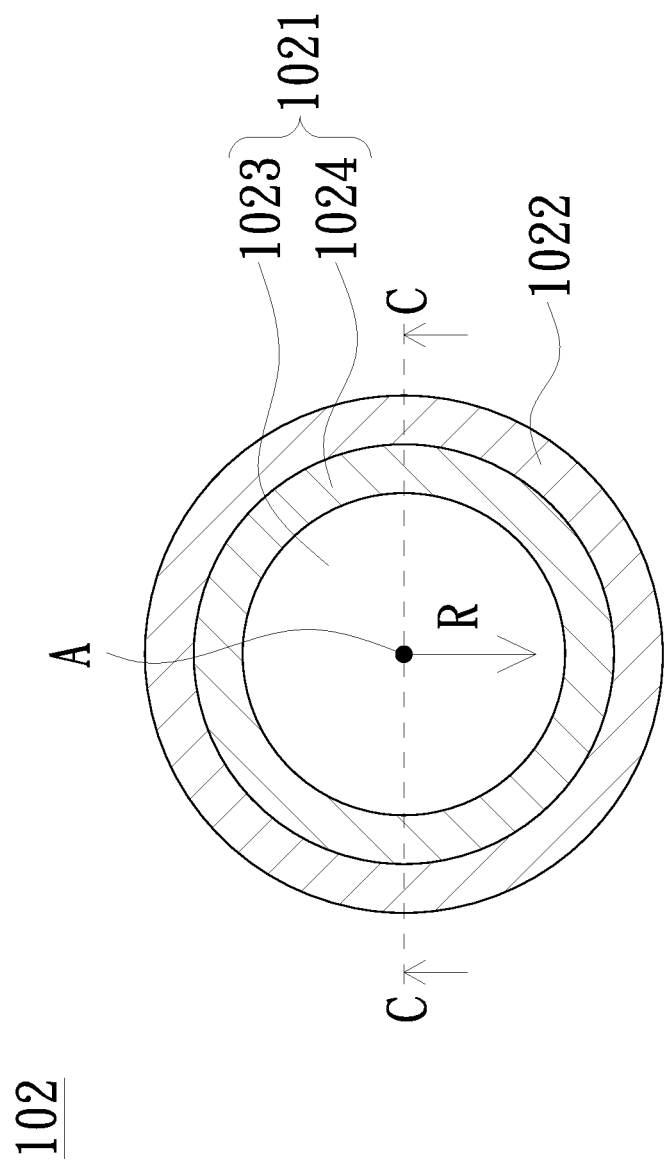
FIG. 2 is a schematic top view of a wavelength conversion device in accordance with an embodiment of the invention.

FIG. 2 is a schematic top view of a wavelength conversion device in accordance with an embodiment of the invention. As shown in FIG. 2, the wavelength conversion element 1021 of the wavelength conversion device 102 of the embodiment includes a first substrate 1023 and at least one wavelength conversion layer 1024; wherein only one exemplary wavelength conversion layer 1024 is shown in FIG. 2. The wavelength conversion layer 1024 is disposed on the first substrate 1023 and surrounding the axle center A of the first substrate 1023. In the embodiment, the wavelength conversion layer 1024 is a layer coated with phosphor, but the invention is not limited thereto. The diffusion element 1022 is connected to the first substrate 1023 of the wavelength conversion element 1021 and surrounding the axle center A of the first substrate 1023. In the embodiment, specifically, the wavelength conversion layer 1024 is disposed between the axle center A of the first substrate 1023 and the diffusion element 1022. More specifically, the wavelength conversion layer 1024 and the diffusion element 1022 are disposed in an annular arrangement along a radial direction R from the axle center A (the wavelength conversion layer 1024 and the diffusion element 1022 have an annular arrangement and are sequentially disposed from the axle center A of the first substrate 1023 along a radial direction R); that is, the wavelength conversion layer 1024 and the diffusion element 1022 have an annular arrangement and both use the axle center A as the axle center thereof. Therefore, the wavelength conversion layer 1024 is referred as an inner circuit of the wavelength conversion device 102; the diffusion element 1022 is referred as an outer circuit of the wavelength conversion device 102; and the diffusion element 1022 surrounds the wavelength conversion layer 1024.

In the embodiment, the first substrate 1023 of the wavelength conversion element 1021 is a disc-shaped metal substrate; but the invention is not limited thereto. In another embodiment, the first substrate 1023 is a light-transmitting substrate. Further, in other embodiments, the first substrate 1023 may have rectangular or other shapes. In the case that the first substrate 1023 has other shapes rather than the disc-like shape, correspondingly the wavelength conversion layer 1024 and the diffusion element 1022 have a similar annular arrangement and are sequentially disposed from the axle center A of the first substrate 1023 along a similar radial direction R.

Figure 3:
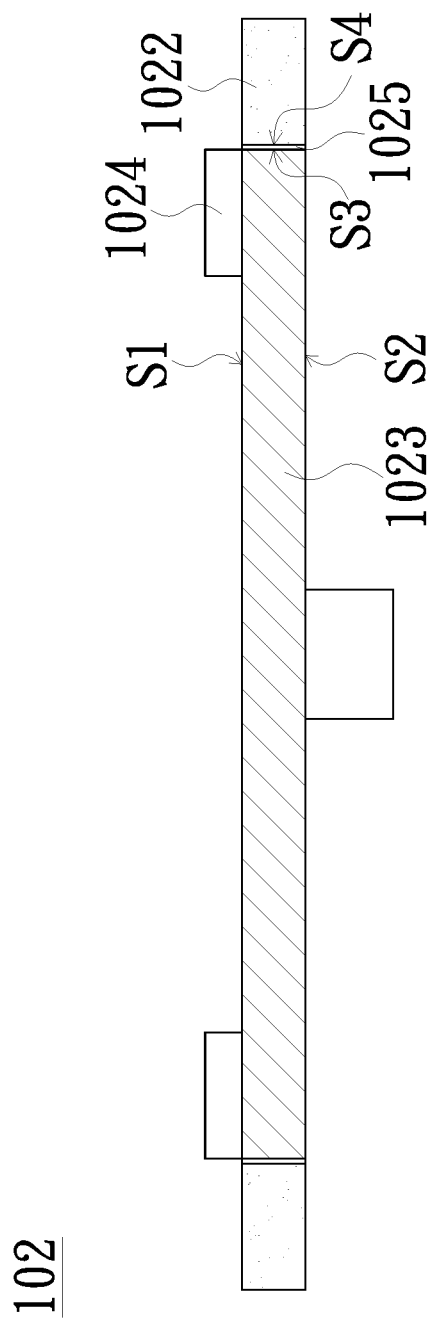
FIG. 3 is a schematic cross-sectional view of the wavelength conversion device, taken along the line C-C in FIG. 2.

FIG. 3 is a schematic cross-sectional view of the wavelength conversion device, taken along the line C-C in FIG. 2. As shown in FIG. 3, the first substrate 1023 of the embodiment has a first surface S1, a second surface S2 and a side surface S3. The first surface S1 and the second surface S2 are opposite to each other and the side surface S3 is adjacently connected between the first surface S1 and the second surface S2. The wavelength conversion layer 1024 is disposed on the first surface S1 of the first substrate 1023 and the first substrate 1023 is connected to a joint surface S4 of the diffusion element 1022. Further, in the embodiment, the wavelength conversion device 102 further includes an adhesive colloid 1025 disposed between the side surface S3 of the first substrate 1023 and the joint surface S4 of the diffusion element 1022. Therefore, through the adhesive colloid 1025, the side surface S3 of the first substrate 1023 is bonded to the joint surface S4 of the diffusion element 1022. In the embodiment, specifically, the joint surface S4 of the diffusion element 1022 is a first flat surface; the side surface S3 of the first substrate 1023 is a second flat surface; but the invention is not limited thereto. In the embodiment, when the first substrate 1023 and the diffusion element 1022 are connected to each other through the adhesive colloid 1025, the first flat surface (the joint surface S4) of the diffusion element 1022 and the second flat surface (the side surface S3) of the first substrate 1023 are jointed to each other.

Figure 4:
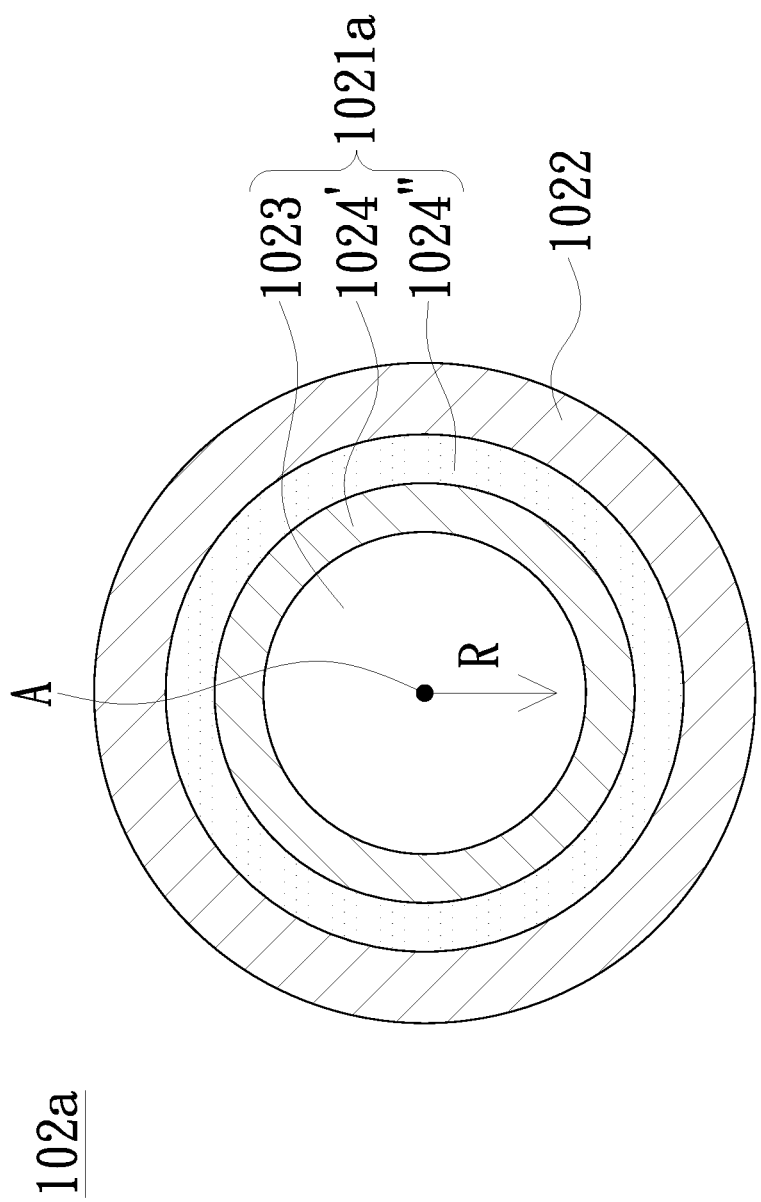
FIG. 4 is a schematic top view of a wavelength conversion device in accordance with another embodiment of the invention.

FIG. 4 is a schematic top view of a wavelength conversion device in accordance with another embodiment of the invention. As shown in FIG. 4, the wavelength conversion device 102a of the embodiment is similar to the wavelength conversion device 102 of FIG. 2. A difference lies in that the number of the wavelength conversion layer of the embodiment is two. Specifically, the wavelength conversion element 1021a of the embodiment includes a first wavelength conversion layer 1024' and a second wavelength conversion layer 1024"; both are disposed on the first substrate 1023. In the embodiment, the first wavelength conversion layer 1024' and the second wavelength conversion layer 1024" each have respective phosphors capable of exciting out light beams with different lights. As shown in FIG. 4, the first wavelength conversion layer 1024', the second wavelength conversion layer 1024" and the diffusion element 1022 have an annular arrangement and are sequentially disposed from the axle center A of the first substrate 1023 along a radial direction R.

It is understood that the number of the wavelength conversion layer is not limited to one (as shown in FIG. 2) or two (as shown in FIG. 4) in the invention. Namely, in other embodiments, the number of the wavelength conversion layer may be more than two in accordance with the needs of the actual situation.

Figure 5:
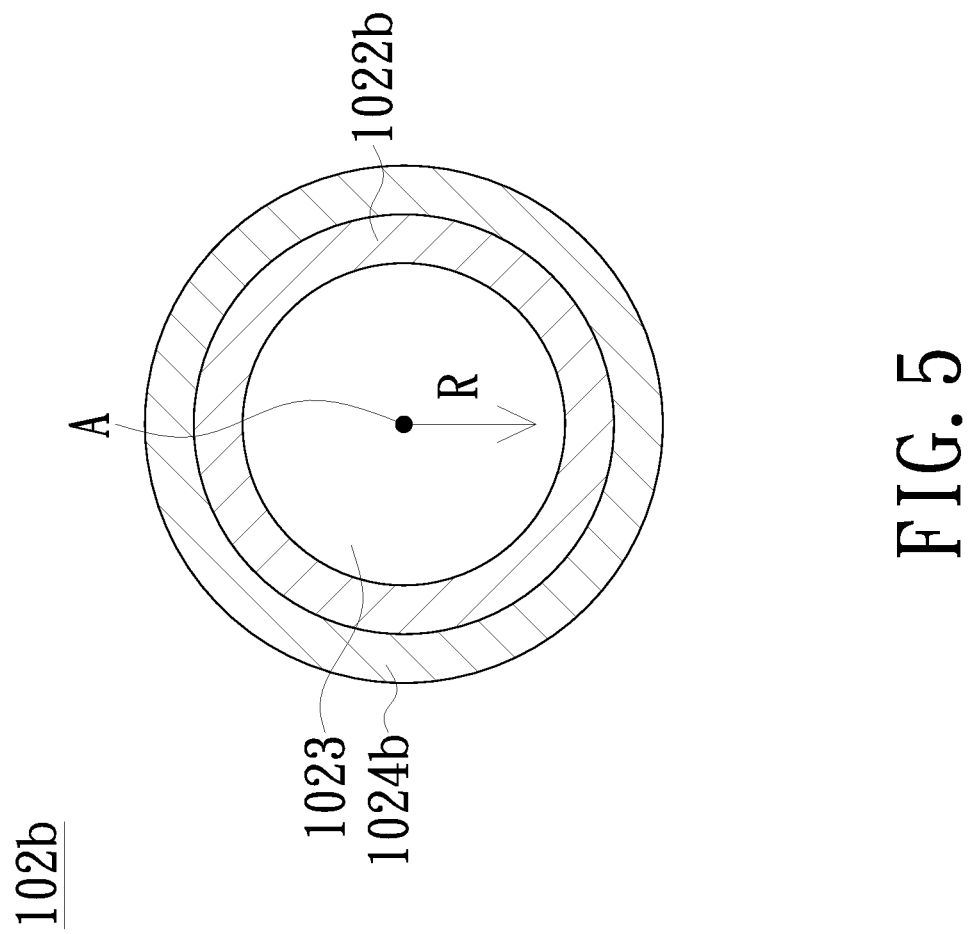
FIG. 5 is a schematic top view of a wavelength conversion device in accordance with another embodiment of the invention.

FIG. 5 is a schematic top view of a wavelength conversion device in accordance with another embodiment of the invention. As shown in FIG. 5, the wavelength conversion device 102b of the embodiment is similar to the wavelength conversion device 102 of FIG. 2. A difference lies in that the diffusion element 1022b of the embodiment is disposed between the axle center A of the first substrate 1023 and the wavelength conversion layer 1024b, and the diffusion element 1022b and the wavelength conversion layer 1024b have an annular arrangement and are sequentially disposed from the axle center A of the first substrate 1023 along a radial direction R; that is, the diffusion element 1022b and the wavelength conversion layer 1024b have an annular arrangement and both use the axle center A as the axle center thereof. Therefore, the diffusion element 1022b is referred as an inner circuit of the wavelength conversion device 102b; the wavelength conversion layer 1024b is referred as an outer circuit of the wavelength conversion device 102b; and the wavelength conversion layer 1024b surrounds the diffusion element 1022b.

In the embodiment, the wavelength conversion device 102b of the embodiment of FIG. 5 is exemplified by including one wavelength conversion layer 1024b; however the invention is not limited thereto. In other embodiments, the number of the wavelength conversion layer 1024b may be two or more than two in accordance with the needs of the actual situation.

Figure 6:
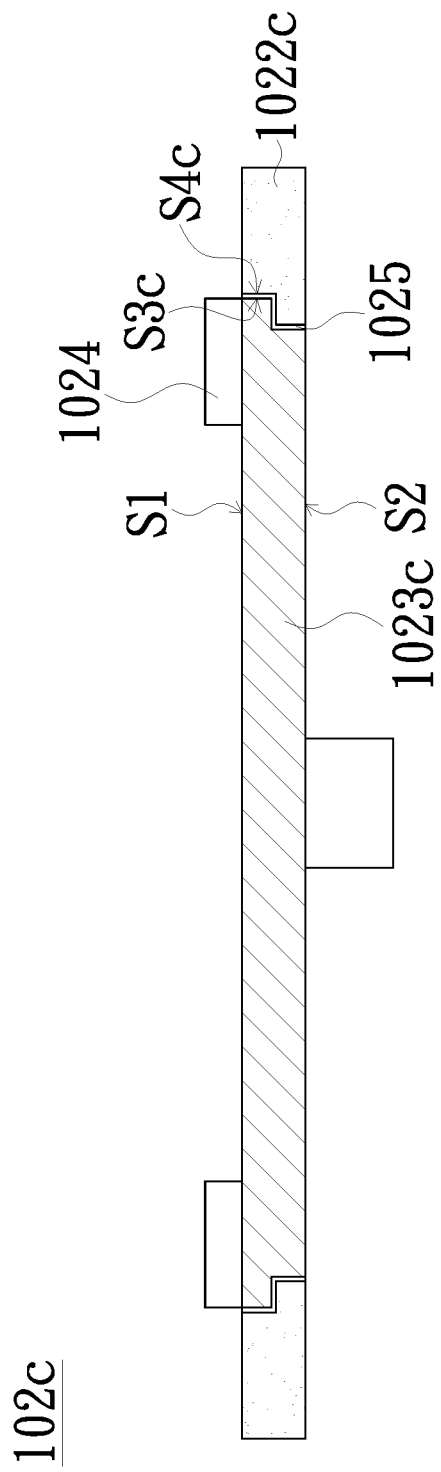
FIG. 6 is a schematic cross-sectional view of a wavelength conversion device in accordance with another embodiment of the invention.

FIG. 6 is a schematic cross-sectional view of a wavelength conversion device in accordance with another embodiment of the invention. As shown in FIG. 6, the wavelength conversion device 102c of the embodiment is similar to the wavelength conversion device 102 of FIG. 3. A difference lies in that the joint surface S4c of the diffusion element 1022c of the embodiment is a first stair surface; the side surface S3c of the first substrate 1023c is a second stair surface; and the first stair surface and the second stair surface have structures matching to each other. In the embodiment, when the first substrate 1023c and the diffusion element 1022c are connected to each other, the first stair surface (the joint surface S4c) of the diffusion element 1022c and the second stair surface (the side surface S3c) of the first substrate 1023c are jointed to each other. Further, in the embodiment, the adhesive colloid 1025 may be disposed between the first stair surface (the joint surface S4c) and the second stair surface (the side surface S3c) for a bonding.

Figure 7:
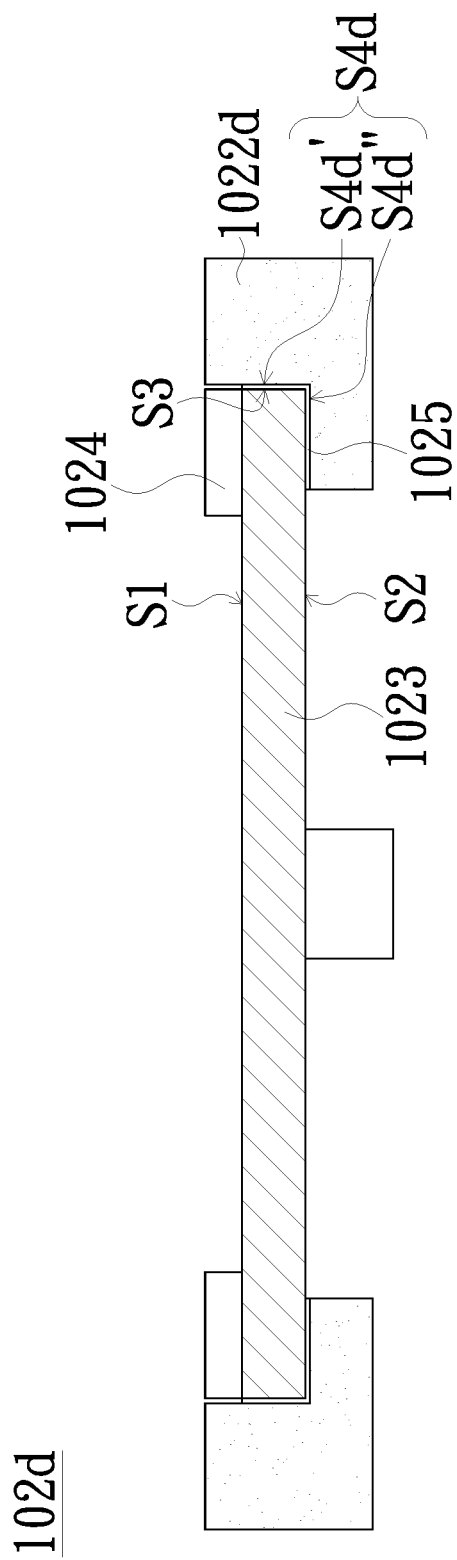
FIG. 7 is a schematic cross-sectional view of a wavelength conversion device in accordance with another embodiment of the invention.

FIG. 7 is a schematic cross-sectional view of a wavelength conversion device in accordance with another embodiment of the invention. As shown in FIG. 7, the wavelength conversion device 102d of the embodiment is similar to the wavelength conversion device 102 of FIG. 3. A difference lies in that the joint surface S4d of the diffusion element 1022d of the embodiment has a first joint surface S4d' and a second joint surface S4d" which are adjacently connected to each other. In the embodiment, when the first substrate 1023 and the diffusion element 1022d are connected to each other, the first joint surface S4d' is jointed to the side surface S3 of the first substrate 1023 and the second joint surface S4d" is jointed to the second surface S2 of the first substrate 1023. Further, in the embodiment, the adhesive colloid 1025 may be disposed between the side surface S3 of the first substrate 1023 and the first joint surface S4d' for a respective bonding; and the adhesive colloid 1025 may be disposed between the second surface S2 of the first substrate 1023 and the second joint surface S4d" for a respective bonding.

Figure 8:
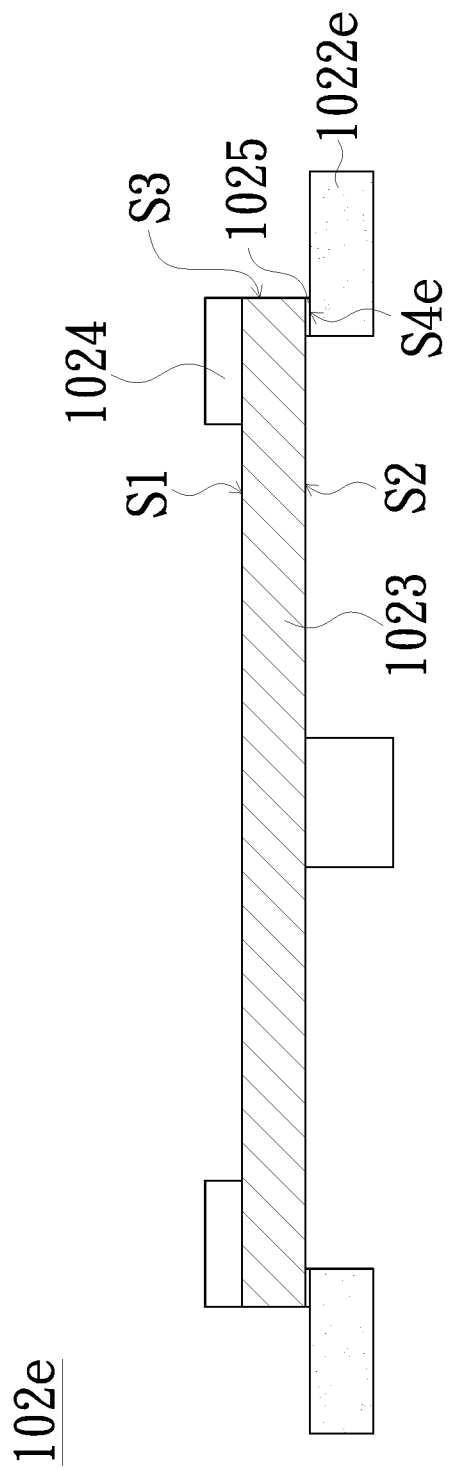
FIG. 8 is a schematic cross-sectional view of a wavelength conversion device in accordance with another embodiment of the invention.

FIG. 8 is a schematic cross-sectional view of a wavelength conversion device in accordance with another embodiment of the invention. As shown in FIG. 8, the wavelength conversion device 102e of the embodiment is similar to the wavelength conversion device 102 of FIG. 3. A difference lies in that the second surface S2 of the first substrate 1023 in the embodiment is provided between the first surface S1 and the joint surface S4e of the diffusion element 1022e. In the embodiment, the joint surface S4e of the diffusion element 1022e is jointed to the second surface S2 of the first substrate 1023; and a portion of the joint surface S4e is exposed from the first substrate 1023. Specifically, in the embodiment, the joint surface S4e of the diffusion element 1022e and the first surface S1 of the first substrate 1023 face to the same direction (e.g., upward). Namely, after being connected to each other, the first substrate 1023 and the diffusion element 1022e are superposed on each other. Further, in the embodiment, the adhesive colloid 1025 may be disposed where the joint surface S4e of the diffusion element 1022e and the second surface S2 of the first substrate 1023 are jointed for a bonding.

Figure 9:
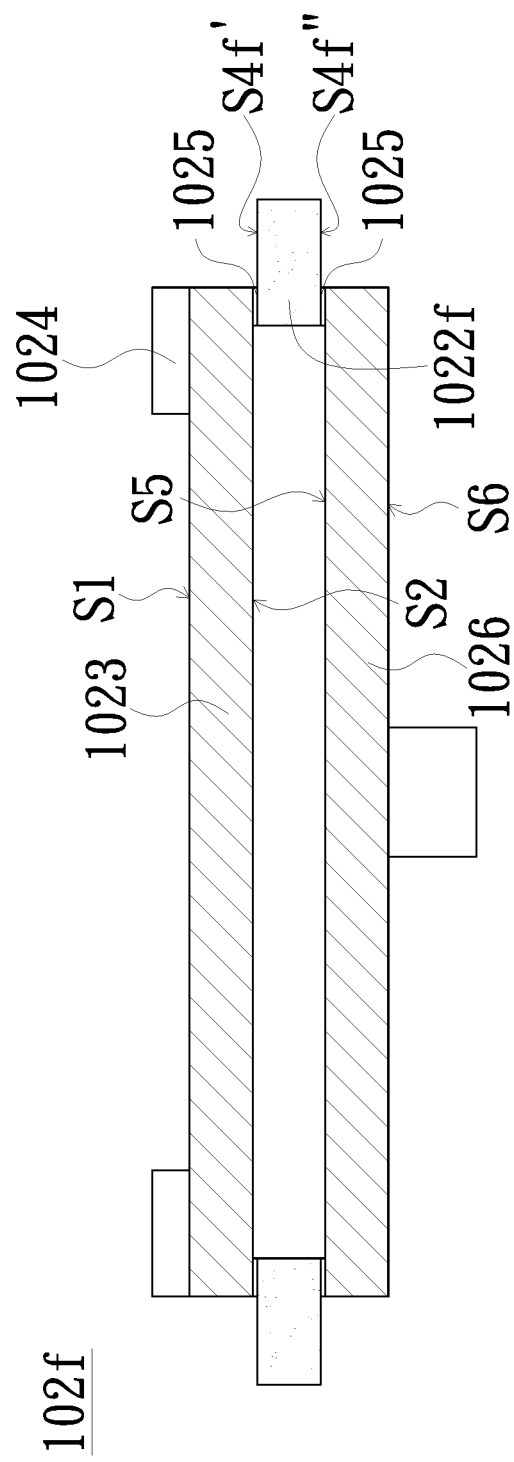
FIG. 9 is a schematic cross-sectional view of a wavelength conversion device in accordance with another embodiment of the invention.

FIG. 9 is a schematic cross-sectional view of a wavelength conversion device in accordance with another embodiment of the invention. As shown in FIG. 9, the wavelength conversion device 102f of the embodiment is similar to the wavelength conversion device 102 of FIG. 3. A difference lies in that the wavelength conversion device 102f of the embodiment further includes a second substrate 1026. The second substrate 1026 has a third surface S5 and a fourth surface S6 which are opposite to each other. The third surface S5 and the first surface S1 of the first substrate 1023 face to the same direction (e.g., upward); and the fourth surface S6 and the second surface S2 of the first substrate 1023 face to the same direction (e.g., downward). In the embodiment, the diffusion element 1022f is disposed between the first substrate 1023 and the second substrate 1026. Specifically, in the embodiment, the joint surface of the diffusion element 1022f has a first joint surface S4f' and a second joint surface S4f". The first joint surface S4f' is jointed to the second surface S2 of the first substrate 1023; and the second joint surface S4f" is jointed to the third surface S5 of the second substrate 1026. More specifically, in the embodiment, the second surface S2 of the first substrate 1023 is disposed between the first surface S1 and the first joint surface S4f'; the third surface S5 of the second substrate 1026 is disposed between the second joint surface S4f" and the fourth surface S6; a portion of the first joint surface S4f' is exposed from the first substrate 1023; and a portion of the second joint surface S4f" is exposed from the second substrate 1026. Further, in the embodiment, the adhesive colloid 1025 may be disposed between the first joint surface S4f' and the second surface S2 of the first substrate 1023 for a respective bonding; and the adhesive colloid 1025 may be disposed between the second joint surface S4f" and the third surface S5 of the second substrate 1026 for a respective bonding.

Figure 10:
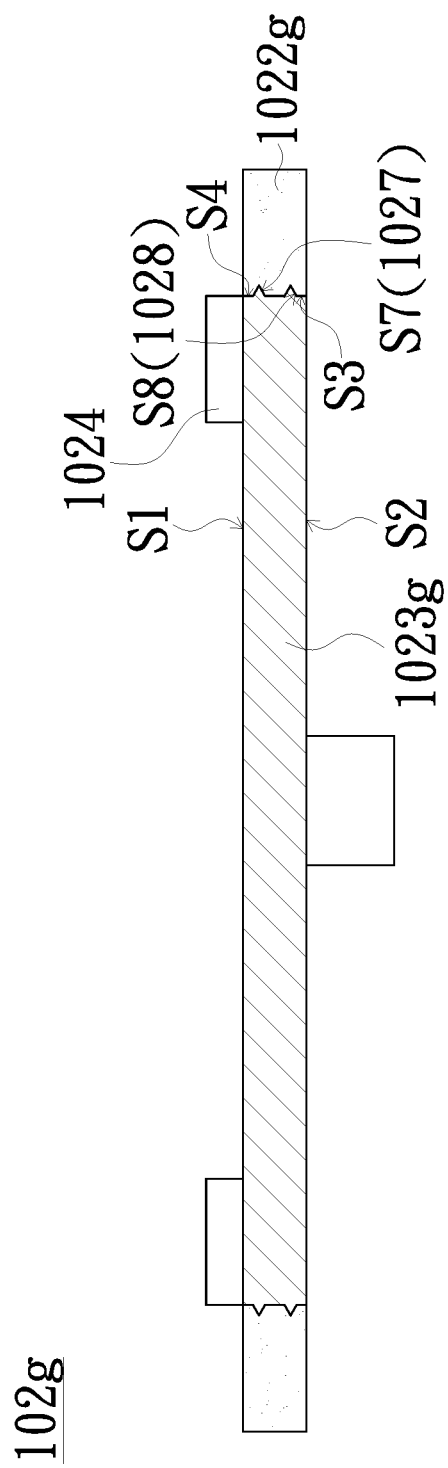
FIG. 10 is a schematic cross-sectional view of a wavelength conversion device in accordance with another embodiment of the invention.

In the above-described embodiments, the connection between the diffusion element (e.g. 1022, 1022b, 1022c, 1022d, 1022e, 1022f) and the first substrate (e.g. 1023, 1023c) is exemplarily realized by the adhesive colloid 1025 for a bonding, but the invention is not limited thereto. In other embodiments, the connection between the diffusion element and the first substrate may be realized by other means as illustrated in FIG. 10, which is a schematic cross-sectional view of a wavelength conversion device in accordance with another embodiment of the invention. As shown in FIG. 10, the wavelength conversion device 102g of the present embodiment is similar to the wavelength conversion device 102 of FIG. 3. A difference lies in that the wavelength conversion device 102g of the present embodiment further includes a first connecting structure 1027 and a second connecting structure 1028. In the present embodiment, the first connecting structure 1027 is disposed on the joint surface S4 of the diffusion element 1022g; the second connecting structure 1028 is disposed on the side surface S3 of the first substrate 1023g; and the first connecting structure 1027 and the second connecting structure 1028 have structures matching to each other. In the present embodiment, when the first substrate 1023g and the diffusion element 1022g are connected to each other, the first connecting structure 1027 and the second connecting structure 1028 are connected to each other. Specifically, in the present embodiment, the first connecting structure 1027 and the second connecting structure 1028 are screw structures matching to each other. The first connecting structure 1027 has a first screw surface S7; the second connecting structure 1028 has a second screw surface S8; and the first screw surface S7 and the second screw surface S8 match to each other. In the present embodiment, when the first substrate 1023g and the diffusion element 1022g are connected to each other, the first screw surface S7 of the first connecting structure 1027 is screwed to the second screw surface S8 of the second connecting structure 1028. Besides being as the screw structures matching to each other, the first connecting structure 1027 on the diffusion element 1022g and the second connecting structure 1028 on the first substrate 1023g may be gear structures matching to each other in anther embodiment. In the above-described embodiments, the connection between the diffusion element 1022g and the first substrate 1023g is exemplarily achieved through the first connecting structure 1027 and the second connecting structure 1028 by mean of screw or gear; however, the present invention is not limited thereto.

According to the above descriptions, it is to be noted that the wavelength conversion device of the projector of the embodiment of the present invention is integrated by a wavelength conversion element and a diffusion element. Therefore, by designing the wavelength conversion element and the diffusion element to be integrated into a one-piece structure, the problems such as high cost, large component size and loud noise are solved at the same time.

It is to be noted that the structure of the projector 1 of FIG. 1 is exemplified by including one single light valve. However, besides applying to the projector structure having one single light valve, the wavelength conversion devices 102, 102a, 102b, 102c, 102d, 102e, 102f and 102g in the aforementioned embodiments each may also apply to the projector structure having a plurality of light valves. The projector structure having a plurality of light valves will be described in detail hereunder.

Figure 11:
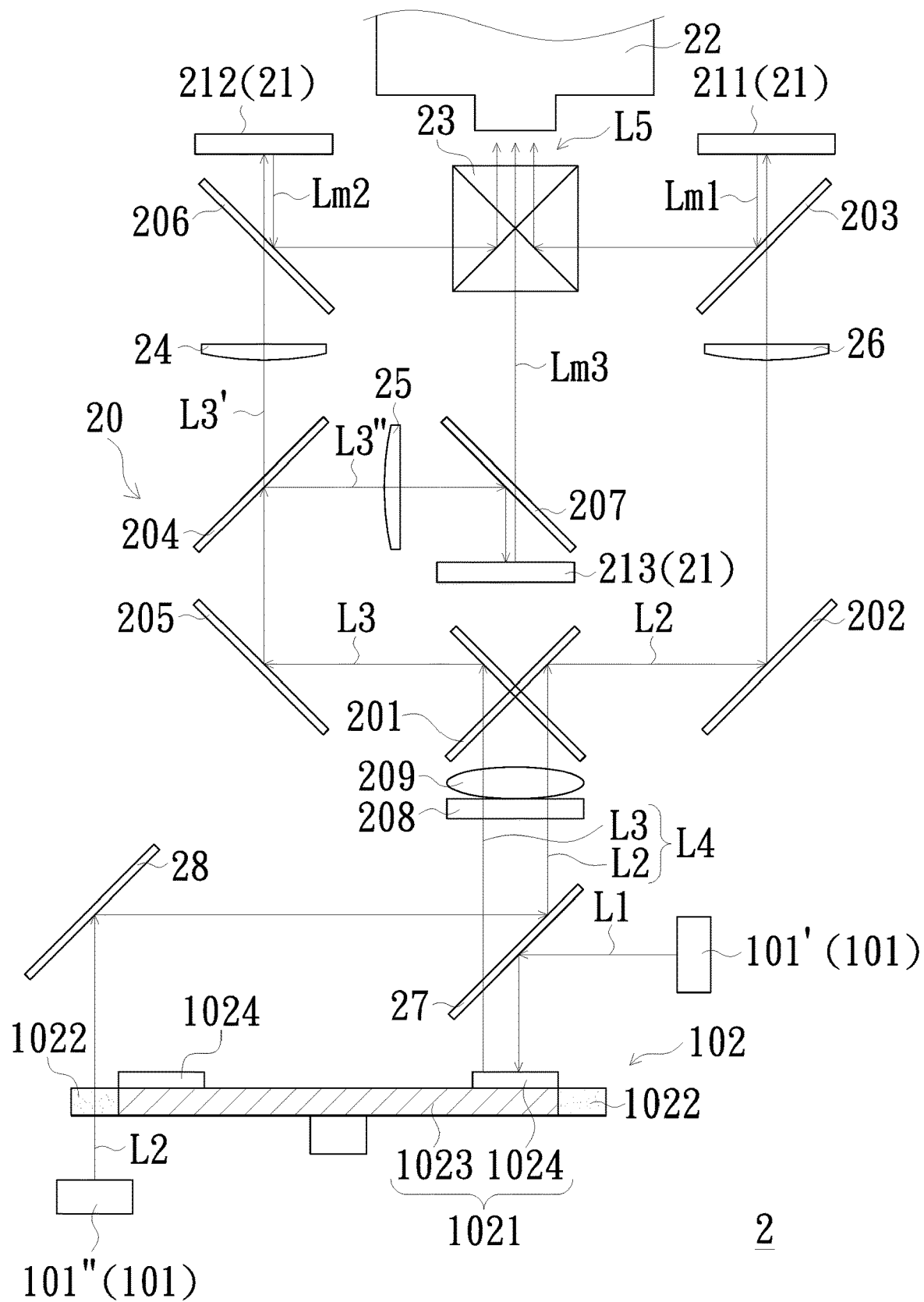
FIG. 11 is a schematic view of a projector in accordance with another embodiment of the invention.

FIG. 11 is a schematic view of a projector in accordance with another embodiment of the present invention. As shown in FIG. 11, the projector 2 of the present embodiment includes an illumination system 20, a light valve 21 and a lens 22. Similar to the illumination system 10 of FIG. 1, the illumination system 20 of the present embodiment also includes the light source device 101 and the wavelength conversion device 102. In the present embodiment, the light source device 101 includes a first light source module 101' and a second light source module 101". In the present embodiment, the light valve 21 includes a first reflective liquid crystal panel 211, a second reflective liquid crystal panel 212 and a third reflective liquid crystal panel 213. In the present embodiment, the projector 2 further includes an X-type light-combining element 23 disposed among the first reflective liquid crystal panel 211, the second reflective liquid crystal panel 212 and the third reflective liquid crystal panel 213. In the present embodiment, the first reflection liquid crystal panel 211, the second reflective liquid crystal panel 212 and the third reflective liquid crystal panel 213 are a LCOS panel.

In the present embodiment, the illumination system 20 further includes an X-type color separation element 201, a first reflective element 202, a first polarization separation element 203, a color separation sheet 204, a second reflective element 205, a second polarization separation element 206 and a third polarization separation element 207. In the present embodiment, the first light source module 101' is configured to provide the first light beam L1; and the second light source module 101" is configured to provide the second light beam L2. The wavelength conversion layer 1024 of the wavelength conversion element 1021 is configured to convert the first light beam L1 into the third light beam L3. The diffusion element 1022 is configured to allow the second light beam L2 pass. In the present embodiment, the third light beam L3 converted from the wavelength conversion layer 1024 and the second light beam L2 past through the diffusion element 1022 together constitute the illumination light beam L4. In the present embodiment, the first light beam L1 and the second light beam L2 are a blue light; the third light beam L3 is a yellow light; but the present invention is not limited thereto.

In the present embodiment, the X-type color separation element 201 is disposed on the transmission path of the illumination light beam L4. The X-type color separation element 201 is configured to separate the illumination light beam L4 into two light beams with different colors and transmit the two light beams toward different directions. In the present embodiment, specifically, the X-type color separation element 201 reflects the second light beam L2 and the third light beam L3 in the illumination light beam L4 to be transmitted toward opposite directions, respectively. More specifically, the X-type color separation element 201 reflects the second light beam L2 in the illumination light beam L4 to be transmitted toward right and reflects the third light beam L3 in the illumination light beam L4 to be transmitted toward left. In the present embodiment, to improve the color saturation of imaging, the wavelength ranges of the second light beam L2 and the third light beam L3 after being reflected by the X-type color separation element 201 are allowed to have some variations, but in general the second light beam L2 and the third light beam L3 are still located in the wavelength ranges of the blue light and the yellow light, respectively. In the present embodiment, the first reflective element 202 is disposed on the transmission path of the second light beam L2 from the X-type color separation element 201. The first reflective element 202 is configured to reflect the second light beam L2 to be transmitted toward the first reflection liquid crystal panel 211. In the present embodiment, the first polarization separation element 203 is disposed between the first reflective element 202 and the first reflection liquid crystal panel 211. The first polarization separation element 203 is configured to allow a portion of the second light beam L2 having a first polarization (e.g., p polarization) to pass through and to be transmitted to the first reflection liquid crystal panel 211. In the present embodiment, the first reflection liquid crystal panel 211 is configured to convert the second light beam L2 having the first polarization into a first sub light beam Lm1 having a second polarization (e.g., s polarization) and reflect the first sub light beam Lm1 to the first polarization separation element 203. The first polarization separation element 203 is configured to reflect the first sub light beam Lm1 from the first reflection liquid crystal panel 211 to the X-type light-combining element 23.

In the present embodiment as shown in FIG. 11, the color separation sheet 204 is disposed on the transmission path of the third light beam L3 from the X-type color separation element 201. The color separation sheet 204 is configured to separate the third light beam L3 into the fourth light beam L3' and the fifth light beam L3" with different colors. In the present embodiment, the fourth light beam L3' can pass through the color separation sheet 204 and the fifth light beam L3" is reflected by the color separation sheet 204. In the present embodiment, the fourth light beam L3' is a red light and the fifth light beam L3" is a green light. In another embodiment, the fourth light beam L3' is a green light and the fifth light beam L3" is a red light. Further, in the present embodiment, the second reflective element 205 is disposed between the color separation sheet 204 and the X-type color separation element 201. The second reflective element 205 is configured to reflect the third light beam L3 from the X-type color separation element 201 to the color separation sheet 204.

In the present embodiment as shown in FIG. 11, the second polarization separation element 206 is disposed between the color separation sheet 204 and the second reflection liquid crystal panel 212. The second polarization separation element 206 is configured to allow a portion of the fourth light beam L3' having the first polarization (e.g., p polarization) to pass through and to be transmitted to the second reflection liquid crystal panel 212. In the present embodiment, the second reflection liquid crystal panel 212 is configured to convert the fourth light beam L3' having the first polarization into a second sub light beam Lm2 having the second polarization (e.g., s polarization) and reflect the second sub light beam Lm2 to the second polarization separation element 206. The second polarization separation element 206 is configured to reflect the second sub light beam Lm2 from the second reflection liquid crystal panel 212 to the X-type light-combining element 23.

In the present embodiment as shown in FIG. 11, the third polarization separation element 207 is disposed between the color separation sheet 204 and the third reflection liquid crystal panel 213. The third polarization separation element 207 is configured to reflect a portion of the fifth light beam L3" having the first polarization (e.g., p polarization) to the third reflection liquid crystal panel 213. In the present embodiment, the third reflection liquid crystal panel 213 is configured to convert the fifth light beam L3" having the first polarization into a third sub light beam Lm3 having the second polarization (e.g., s polarization) and reflect the third sub light beam Lm3 to the third polarization separation element 207. The third polarization separation element 207 is configured to reflect the third sub light beam Lm3 from the third reflection liquid crystal panel 213 to the X-type light-combining element 23.

In the present embodiment as shown in FIG. 11, the X-type light-combining element 23 is configured to reflect the first sub light beam Lm1 and the second sub light beam Lm2 and allow the third sub light beam Lm3 to pass through, so as to combine the first sub light beam Lm1, the second sub light beam Lm2 and the third sub light beam Lm3 into the image beam L5 transmitting toward a projection lens 22. The projection lens 22 is configured to convert the image beam L5 into a projection light beam and project the projection light beam onto a screen, so as to form images on the screen.

In the present embodiment, the first polarization and the second polarization are exemplified by being the p polarization and the s polarization, respectively; however, the present invention is not limited thereto. In another embodiment, the first polarization and the second polarization can be the s polarization and the p polarization, respectively. Further, in the present embodiment, the illumination system 20 may further include a polarization conversion element 208 disposed between the wavelength conversion device 102 and the X-type color separation element 201. The polarization conversion element 208 is configured to covert the polarization of the illumination light beam L4 into the first polarization. In addition, the illumination system 20 of the present embodiment may further include lenses and/or other optical components, such as a lens 209 disposed between the polarization conversion element 208 and the X-type color separation element 201, a lens 24 disposed between the second polarization separation element 206 and the color separation sheet 204, a lens 25 disposed between the color separation sheet 204 and the third polarization separation element 207, a lens 26 disposed between the first polarization separation element 203 and the first reflective element 202, a third reflective element 27 disposed on the transmission path of the first light beam L1, and a fourth reflective element 28 disposed on the transmission path of the second light beam L2. In another embodiment, the wavelength conversion device 102 in FIG. 11 may be replaced by any one of the aforementioned wavelength conversion devices 102a, 102b, 102c, 102d, 102e, 102f and 102g.

The projector structure illustrated in FIG. 11 is only one exemplary embodiment of the present invention; and the present invention is not limited thereto. In other embodiments, the selection and number of the optical components in the projector structure of FIG. 11 can be modulated in accordance with the needs of actual situation. Further, it is understood that the optical path may vary according to the disposition of respective optical component.

In summary, the wavelength conversion device of the projector of the embodiment of the invention includes the wavelength conversion element and the diffusion element both. The wavelength conversion element of the embodiment of the invention includes the first substrate and the wavelength conversion layer. The wavelength conversion layer is disposed on the first substrate and surrounding the axle center of the first substrate. The diffusion element is connected to the first substrate and surrounding the axle center of the first substrate. Therefore, by designing the wavelength conversion element and the diffusion element to be integrated into a one-piece structure, the problems such as high cost, large component size and loud noise are solved at the same time.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising:
   an illumination system, comprising:
      a light source device, adapted to provide a first light beam and a second light beam; and
      a wavelength conversion device, disposed on transmission paths of the first light beam and the second light beam, the wavelength conversion device comprising:
         a wavelength conversion element, comprising a first substrate and at least one wavelength conversion layer, wherein the first substrate is a metal substrate, the at least one wavelength conversion layer is disposed on the first substrate and surrounds an axle center of the first substrate, the at least one wavelength conversion layer is adapted to convert the first light beam into a third light beam; and
         a diffusion element, connected to the first substrate and surrounding the axle center of the first substrate to form a closed annular ring, adapted to allow the second light beam to pass through, wherein a distance between an outer edge of the diffusion element and the axle center of the first substrate is longer than a radius of the first substrate, the at least one wavelength conversion layer is surrounded by the diffusion element and is disposed between the axle center and the diffusion element, the second light beam and the third light beam constitute an illumination light beam, and the diffusion element and the wavelength conversion element are two separate elements, wherein the first substrate comprises a first surface, a second surface, and a side surface, the first surface and the second surface are arranged along the axle center and are opposite to each other, the side surface is adjacently connected between the first surface and the second surface, the at least one wavelength conversion layer is disposed on the first surface, and the first substrate is connected to a joint surface of the diffusion element, wherein the joint surface comprises a first joint surface and a second joint surface, the first joint surface is jointed to the at least one wavelength conversion layer and the side surface of the first substrate, and the second joint surface is jointed to the second surface of the first substrate;
   at least one light valve, disposed on a transmission path of the illumination light beam, and adapted to convert the illumination light beam into an image light beam; and
   a lens, disposed on a transmission path of the image light beam, and adapted to convert the image light beam into a projection light beam.

2. The projector according to claim 1, wherein a quantity of the at least one wavelength conversion layer is one, the wavelength conversion layer and the diffusion element are disposed in an annular arrangement along a radial direction from the axle center.

3. The projector according to claim 1, wherein a quantity of the at least one wavelength conversion layer is plural, the wavelength conversion layers respectively have phosphors capable of exciting out beams with different colors, the wavelength conversion layers and the diffusion element are disposed in an annular arrangement along a radial direction from the axle center.

4. The projector according to claim 1, wherein the joint surface is a first flat surface, the side surface of the first substrate is a second flat surface, and the first flat surface is jointed to the second flat surface.

5. The projector according to claim 1, wherein the joint surface is a first stair surface, the side surface of the first substrate is a second stair surface, the first stair surface and the second stair surface are matched with each other, and the first stair surface is jointed to the second stair surface.

6. The projector according to claim 1, wherein the second surface is disposed between the first surface and the joint surface, the joint surface is jointed to the second surface of the first substrate, and a portion of the joint surface is exposed from the first substrate.

7. The projector according to claim 6, wherein the wavelength conversion device further comprises a second substrate, the diffusion element is disposed between the first substrate and the second substrate, the second substrate comprises a third surface and a fourth surface opposite to each other, the joint surface comprises a first joint surface and a second joint surface, the first joint surface is jointed to the second surface, the second joint surface is jointed to the third surface, the second surface is disposed between the first surface and the first joint surface, the third surface is disposed between the second joint surface and the fourth surface, a portion of the first joint surface is exposed from the first substrate, and a portion of the second joint surface is exposed from the second substrate.

8. The projector according to claim 1, wherein the wavelength conversion device further comprises a first connecting structure and a second connecting structure, the first connecting structure is disposed on the joint surface of the diffusion element, the second connecting structure is disposed on the side surface of the first substrate, the first connecting structure and the second connecting structure are matched with each other, and the first connecting structure is connected to the second connecting structure.

9. The projector according to claim 1, wherein the wavelength conversion device further comprises an adhesive colloid disposed between the first substrate and the joint surface, the first substrate is bonded to the joint surface of the diffusion element through the adhesive colloid.

10. A wavelength conversion device, comprising:
a wavelength conversion element, comprising a first substrate and at least one wavelength conversion layer, wherein the first substrate is a metal substrate, the at least one wavelength conversion layer is disposed on the first substrate and surrounds an axle center of the first substrate, the at least one wavelength conversion layer is adapted to perform a conversion on a light beam; and
a diffusion element, connected to the first substrate of the wavelength conversion element and surrounding the axle center of the first substrate to form a closed annular ring, wherein a distance between an outer edge of the diffusion element and the axle center of the first substrate is longer than a radius of the first substrate, the at least one wavelength conversion layer is surrounded by the diffusion element and is disposed between the axle center and the diffusion element, the diffusion element is adapted to allow another light beam to pass through, and the diffusion element and the wavelength conversion element are two separate elements, wherein the first substrate comprises a first surface, a second surface, and a side surface, the first surface and the second surface are arranged along the axle center and are opposite to each other, the side surface is adjacently connected between the first surface and the second surface, the at least one wavelength conversion layer is disposed on the first surface, and the first substrate is connected to a joint surface of the diffusion element, wherein the joint surface comprises a first joint surface and a second joint surface, the first joint surface is jointed to the at least one wavelength conversion layer and the side surface of the first substrate, and the second joint surface is jointed to the second surface of the first substrate.

11. The wavelength conversion device according to claim 10, wherein a quantity of the at least one wavelength conversion layer is one, the wavelength conversion layer and the diffusion element are disposed in an annular arrangement along a radial direction from the axle center.

12. The wavelength conversion device according to claim 10, wherein a quantity of the at least one wavelength conversion layer is plural, the wavelength conversion layers respectively have phosphors capable of exciting out beams with different colors, the wavelength conversion layers and the diffusion element are disposed in an annular arrangement along a radial direction from the axle center.

13. The wavelength conversion device according to claim 10, wherein the joint surface is a first flat surface, the side surface of the first substrate is a second flat surface, and the first flat surface is jointed to the second flat surface.

14. The wavelength conversion device according to claim 10, wherein the joint surface is a first stair surface, the side surface of the first substrate is a second stair surface, the first stair surface and the second stair surface are matched with each other, and the first stair surface is jointed to the second stair surface.

15. The wavelength conversion device according to claim 10, wherein the second surface is disposed between the first surface and the joint surface, the joint surface is jointed to the second surface of the first substrate, and a portion of the joint surface is exposed from the first substrate.

16. The wavelength conversion device according to claim 15, further comprising a second substrate, wherein the diffusion element is disposed between the first substrate and the second substrate, the second substrate comprises a third surface and a fourth surface opposite to each other, the joint surface comprises a first joint surface and a second joint surface, the first joint surface is jointed to the second surface, the second joint surface is jointed to the third surface, the second surface is disposed between the first surface and the first joint surface, the third surface is disposed between the second joint surface and the fourth surface, a portion of the first joint surface is exposed from the first substrate, and a portion of the second joint surface is exposed from the second substrate.

17. The wavelength conversion device according to claim 10, further comprising a first connecting structure and a second connecting structure, wherein the first connecting structure is disposed on the joint surface of the diffusion element, the second connecting structure is disposed on the side surface of the first substrate, the first connecting structure and the second connecting structure are matched with each other, and the first connecting structure is connected to the second connecting structure.

18. The wavelength conversion device according to claim 10, further comprising an adhesive colloid disposed between the first substrate and the joint surface.

19. A projector, comprising:
an illumination system, comprising:
a light source device, adapted to provide a first light beam and a second light beam; and
a wavelength conversion device, disposed on transmission paths of the first light beam and the second light beam, the wavelength conversion device comprising:
a wavelength conversion element, comprising a first substrate having a first surface and a second surface opposite to each other, and at least one wavelength conversion layer, wherein the at least one wavelength conversion layer is disposed on the first substrate and surrounds an axle center of the first substrate, the at least one wavelength conversion layer is adapted to receive the first light beam transmitted along a first direction and convert the first light beam into a third light beam; and
a diffusion element, connected to the first substrate and surrounding the axle center of the first substrate to form a closed annular ring, adapted to receive the second light beam transmitted along a second direction opposite to the first direction and allow the second light beam to pass through, wherein the second light beam and the third light beam constitute an illumination light beam, wherein the first substrate comprises a first surface, a second surface, and a side surface, the first surface and the second surface are arranged along the axle center and are opposite to each other, the side surface is adjacently connected between the first surface and the second surface, the at least one wavelength conversion layer is disposed on the first surface, and the first substrate is connected to a joint surface of the diffusion element, wherein the joint surface comprises a first joint surface and a second joint surface, the first joint surface is jointed to the at least one wavelength conversion layer and the side surface of the first substrate, and the second joint surface is jointed to the second surface of the first substrate;

at least one light valve, disposed on a transmission path of the illumination light beam, and adapted to convert the illumination light beam into an image light beam; and a lens, disposed on a transmission path of the image light beam, and adapted to convert the image light beam into a projection light beam.

* * * * *